(12) United States Patent
Kim et al.

(10) Patent No.: US 10,841,814 B2
(45) Date of Patent: Nov. 17, 2020

(54) APPARATUS AND METHOD FOR MITIGATING INTERFERENCE IN WIRELESS COMMUNICATION SYSTEM

(71) Applicant: SAMSUNG ELECTRONICS CO., LTD., Suwon-si (KR)

(72) Inventors: Dong-Sik Kim, Pohang-si (KR); Hui-Won Je, Gwacheon-si (KR); In-Hyoung Kim, Yongin-si (KR); Se-Bin Im, Hwaseong-si (KR); Young-Seok Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 359 days.

(21) Appl. No.: 15/582,901

(22) Filed: May 1, 2017

(65) Prior Publication Data

US 2018/0035316 A1    Feb. 1, 2018

(30) Foreign Application Priority Data

Jul. 26, 2016    (KR) .......................... 10-2016-0094784

(51) Int. Cl.
| | |
|---|---|
| *H04L 1/20* | (2006.01) |
| *H04L 5/00* | (2006.01) |
| *H04J 11/00* | (2006.01) |
| *H04L 27/26* | (2006.01) |
| *H04W 24/02* | (2009.01) |
| *H04L 12/18* | (2006.01) |
| *H04L 1/00* | (2006.01) |

(52) U.S. Cl.
CPC ........... *H04W 24/02* (2013.01); *H04J 11/005* (2013.01); *H04L 1/0045* (2013.01); *H04L 1/20* (2013.01); *H04L 5/0035* (2013.01); *H04L 5/0048* (2013.01); *H04L 12/1836* (2013.01); *H04L 27/265* (2013.01); *H04L 5/005* (2013.01); *H04L 5/0053* (2013.01); *H04L 5/0073* (2013.01)

(58) Field of Classification Search
CPC ... H04L 1/0026; H04L 5/0048; H04L 1/0045; H04L 1/1812; H04L 1/0027; H04L 1/0057; H04L 43/0823; H04L 5/0035; H04L 5/0044; H04L 12/1836; H04L 12/28
USPC .......................................... 375/346; 370/329
See application file for complete search history.

(56) References Cited

U.S. PATENT DOCUMENTS

| | | | |
|---|---|---|---|
| 2012/0201152 A1* | 8/2012 | Yoo ...................... | H04B 17/345 370/252 |
| 2012/0202541 A1* | 8/2012 | Koo ......................... | H04L 1/20 455/501 |
| 2014/0153510 A1* | 6/2014 | Gomadam ............ | H04L 5/0073 370/329 |

(Continued)

*Primary Examiner* — David C Payne
*Assistant Examiner* — Sarah Hassan
(74) *Attorney, Agent, or Firm* — Sughrue Mion, PLLC

(57) ABSTRACT

A chipset including at least one processor is provided. The at least one processor of the chipset is configured to acquire an interference whitening (IW) and detection scheme and demodulate an interference signal based on the acquired IW and detection scheme, wherein the IW and detection scheme is determined based on an interference characteristic of the interference signal, and the interference characteristic is determined based on whether a region in which the interference signal is included collides with a reference signal region of a serving cell and whether the interference signal is a reference signal.

18 Claims, 7 Drawing Sheets

(56) References Cited

U.S. PATENT DOCUMENTS

2015/0341942 A1* 11/2015 Lee ................... H04B 7/0626
  370/252
2015/0372779 A1* 12/2015 Lim ................... H04J 11/005
  370/338

* cited by examiner

APPARATUS AND METHOD FOR MITIGATING INTERFERENCE IN WIRELESS COMMUNICATION SYSTEM

CROSS-REFERENCE TO THE RELATED APPLICATION

This application claims priority from Korean Patent Application No. 10-2016-0094784 filed in the Korean Intellectual Property Office on Jul. 26, 2016, the entire disclosure of which is incorporated herein by reference.

TECHNICAL FIELD

Apparatuses and methods consistent with the exemplary embodiments of the inventive concept relate to mitigating interference in a wireless communication system, and more particularly, to mitigating interference in a control channel region in a wireless communication system.

BACKGROUND

In a wireless communication system, various schemes for enhancing system performance have been proposed. One of the various schemes proposed for enhancing the system performance is a scheme of mitigating interference.

In a wireless communication system, system performance may be enhanced in a control channel region as well as a data channel region. However, most of interference mitigating schemes proposed up to now target interference modeling for interference from an interference cell and interference suppression and interference cancelation which are based on the interference modeling.

That is, even though performance of a control channel region is of importance in a case that a receiving apparatus, e.g., a mobile station (MS), receives data, most of interference mitigating schemes proposed up to now target interference suppression and interference cancellation for a data channel region, so there is a need for an effective interference mitigating scheme for a control channel region.

For example, if cells are overlapped, interference in a control channel region increased. In this case, control information transmitted through the control channel region, e.g., control information related to handover of an MS, may be lost. If the control information related to the handover of the MS is lost, the MS may not perform a handover operation, so it may be impossible to provide a service to the MS. In this case, system performance of the wireless communication system may be significantly degraded.

Even though the control information transmitted through the control channel region needs to be considered a factor of enhancing system performance, most of interference mitigating schemes proposed up to now target a data channel region without considering a control channel region.

So, there is a need for effectively mitigating interference in a control channel region in a wireless communication system.

The above information is presented as background information only to assist with an understanding of the inventive concept. No determination has been made, and no assertion is made, as to whether any of the above might be applicable as prior art with regard to the inventive concept.

SUMMARY

Exemplary embodiments of the inventive concept address at least the above-mentioned problems and/or disadvantages and provide at least the advantages described below. Accordingly, the exemplary embodiments of the inventive concept provide an apparatus and method for mitigating interference in a wireless communication system.

The exemplary embodiments of the inventive concept provide an apparatus and method for mitigating interference in a control channel region in a wireless communication system.

The exemplary embodiments of the inventive concept provide an apparatus and method for mitigating interference in a control channel region by considering an encoding scheme used in an interference cell in a wireless communication system.

The exemplary embodiments of the inventive concept provide an apparatus and method for mitigating interference in a control channel region by considering a timing offset between a service cell and an interference cell in a wireless communication system.

The exemplary embodiments of the inventive concept provide an apparatus and method for adaptively setting a demodulation scheme applied to a control channel region.

According to an exemplary embodiment of the inventive concept, there is provided a method of mitigating interference. The method may include: acquiring an interference whitening (IW) and detection scheme; and demodulating an interference signal based on the acquired IW and detection scheme, wherein the IW and detection scheme is determined based on an interference characteristic of the interference signal, and the interference characteristic is determined based on whether a region in which the interference signal is included collides with a reference signal region of a serving cell and whether the interference signal is a reference signal.

According to an exemplary embodiment of the inventive concept, there is provided a chipset which may include at least one processor configured to acquire an interference whitening (IW) and detection scheme and demodulate an interference signal based on the acquired IW and detection scheme, wherein the IW and detection scheme is determined based on an interference characteristic of the interference signal, and the interference characteristic is determined based on whether a region in which the interference signal is included collides with a reference signal region of a serving cell and whether the interference signal is a reference signal.

According to an exemplary embodiment of the inventive concept, there is provided a chipset which may include: a memory storing computer executable instructions; and at least one processor configured to read and execute the computer executable instructions to demodulate an interference signal in at least one interference cell using an interference whitening (IW) scheme suitable for a reference signal in a serving cell. Here, the IW scheme may be selected from among a plurality of different IW schemes based on a location of the interference signal in the interference cell with respect to the reference signal of the serving cell, whether the interference signal is a reference signal in the interference cell, and a number of symbols included in the interference signal if the interference signal is not the reference signal.

BRIEF DESCRIPTION OF THE DRAWINGS

The above and other aspects of the exemplary embodiments of the inventive concept will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
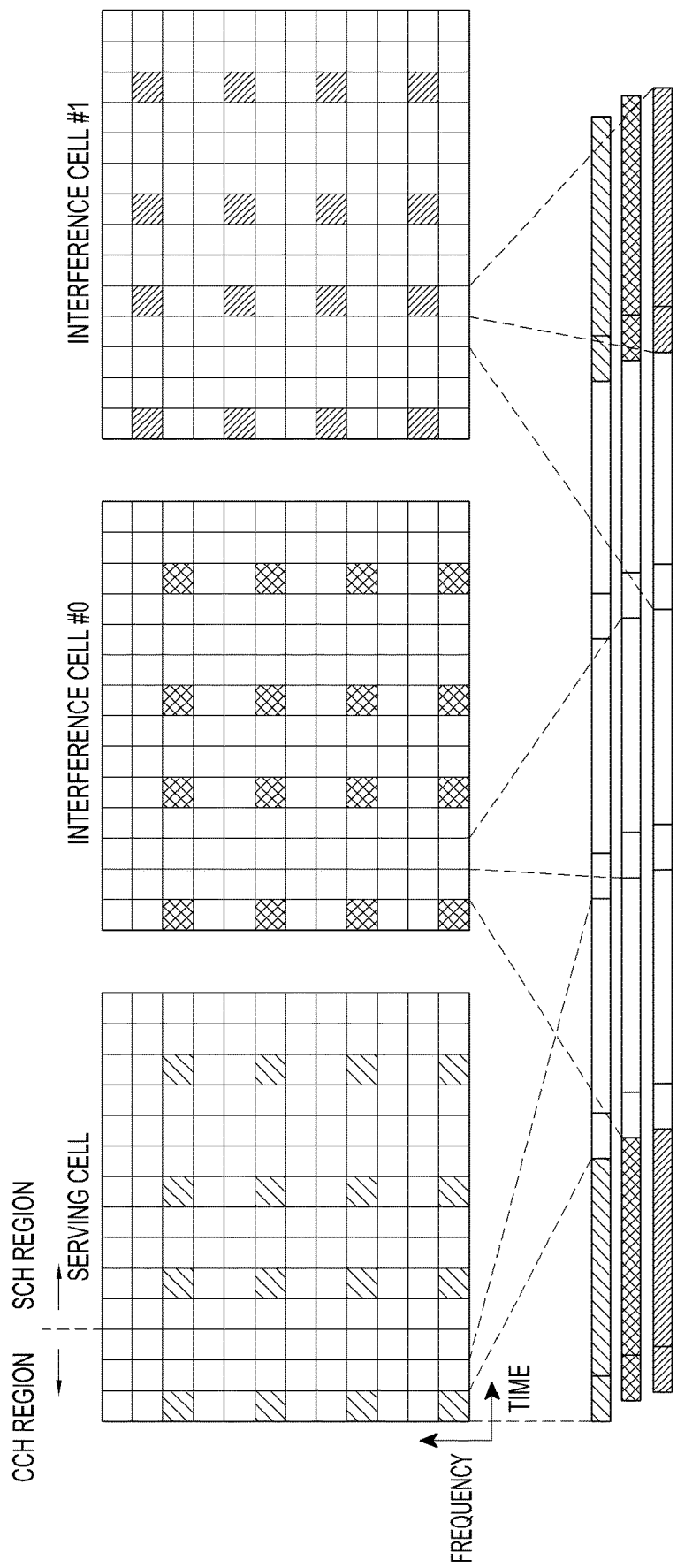
FIG. 1 schematically illustrates a cell-specific reference signal (CRS) region structure in a serving cell and interference cells and a timing relation among the serving cell and the interference cells in a long term evolution (LTE) mobile communication system, according to an exemplary embodiment of the inventive concept.

The following description with reference to the accompanying drawings is provided to assist in a comprehensive understanding of various exemplary embodiments of the inventive concept as defined by the claims and their equivalents. It includes various specific details to assist in that understanding but these are to be regarded as merely exemplary. Accordingly, those of ordinary skill in the art will recognize that various changes and modifications of the various exemplary embodiments described herein can be made without departing from the scope and spirit of the inventive concept. In addition, descriptions of well-known functions and constructions may be omitted for clarity and conciseness.

The terms and words used in the following description and claims are not limited to the bibliographical meanings, but, are merely used by the inventor to enable a clear and consistent understanding of the inventive concept. Accordingly, it should be apparent to those skilled in the art that the following description of various exemplary embodiments of the inventive concept is provided for illustration purpose only and not for the purpose of limiting the inventive concept as defined by the appended claims and their equivalents.

It is to be understood that the singular forms "a," "an," and "the" may indicate plural referents unless the context clearly dictates otherwise. Thus, for example, reference to "a component surface" may include reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various exemplary embodiments only and is not intended to be limiting. As used herein, the singular forms may be intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various exemplary embodiments of the inventive concept, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various exemplary embodiments of the inventive concept, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the inventive concept, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the inventive concept, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the inventive concept, an electronic device may be any combination of the foregoing devices. In addition, it will be apparent to one having ordinary skill in the art that an electronic device according to various exemplary embodiments of the inventive concept is not limited to the foregoing devices.

According to various exemplary embodiments of the inventive concept, a transmitting apparatus may be a mobile station (MS) or a base station (BS). Here, the MS may be implemented with one chipset.

According to various exemplary embodiments of the inventive concept, a receiving apparatus may be an MS or a BS.

According to various exemplary embodiments of the inventive concept, for example, an MS may be an electronic device.

In various exemplary embodiments of the inventive concept, it will be noted that the term MS may be interchangeable with the term terminal, user equipment (UE), wireless terminal, mobile device, and/or the like.

In various exemplary embodiments of the inventive concept, it will be noted that the term BS may be interchangeable with the term node B, evolved node B (eNB), access point (AP), and/or the like.

An exemplary embodiment of the inventive concept proposes an apparatus and method for mitigating interference in a wireless communication system.

An exemplary embodiment of the inventive concept proposes an apparatus and method for mitigating interference on a control channel region in a wireless communication system.

An exemplary embodiment of the inventive concept proposes an apparatus and method for mitigating interference in a control channel region by considering an encoding scheme used in an interference cell in a wireless communication system.

An exemplary embodiment of the inventive concept proposes an apparatus and method for mitigating interference in a control channel region by considering a timing offset between a service cell and an interference cell in a wireless communication system.

An exemplary embodiment of the inventive concept proposes an apparatus and method for adaptively setting a demodulation scheme applied to a control channel region.

An apparatus and method proposed in various exemplary embodiments of the inventive concept may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

For convenience, in an exemplary embodiment of the inventive concept, it will be assumed that a wireless communication system is an LTE mobile communication system.

For example, it will be assumed that an LTE mobile communication system uses an orthogonal frequency division multiplexing (OFDM) scheme as a modulation scheme. In the LTE mobile communication system, a time interval during which 12 OFDM symbols or 14 OFDM symbols are transmitted is a sub-frame as a minimum transmission time interval (TTI). In the LTE mobile communication system, various operations such as a resource allocating operation, and/or the like are performed based on a sub-frame.

Firstly, a cell-specific reference signal (CRS) region structure in a serving cell and interference cells and a timing relation among the serving cell and the interference cells in an LTE mobile communication system according to an exemplary embodiment of the inventive concept will be described with reference to FIG. 1.

FIG. 1 schematically illustrates a CRS region structure in a serving cell and interference cells and a timing relation among the serving cell and the interference cells in an LTE mobile communication system, according to an exemplary embodiment of the inventive concept.

Referring to FIG. 1, in the LTE mobile communication system, it will be assumed that one sub-frame includes 14 OFDM symbols, and a region which occupies one sub-frame in a time domain and occupies 12 sub-carriers in a frequency domain is a CRS region. Here, the CRS region denotes a resource region related to CRS transmission, and a CRS is an example of a reference signal which may be used on channel estimation, and/or the like. The CRS illustrated in FIG. 1 may be identical to a CRS used in a general LTE mobile communication system, so a detailed description thereof will be omitted herein.

In an exemplary embodiment of the inventive concept, a CRS region occupies one sub-frame in a time domain, and occupies 12 sub-carriers in a frequency domain. However, there is no limitation on the number of sub-frames which the CRS region occupies in the time domain and the number of sub-carriers which the CRS region occupies in the frequency domain.

A region which is occupied by one sub-carrier and one OFDM symbol will be referred to as radio element (RE). So, a CRS region may include at least one RE. In FIG. 1, the CRS region includes 12×14 REs.

In the CRS illustrated in FIG. 1, hatched areas indicate REs which denote CRS symbols included in the CRS, and REs other than REs on which CRS symbols are transmitted in the CRS region are REs on which non-CRS symbols are transmitted or CRS symbols are not transmitted. That is, the CRS region includes CRS symbols and non-CRS symbols. Here, various signals, not a CRS, e.g., a control channel signal or a data channel signal may be transmitted through non-CRS symbols.

Further, a timing relation among a serving cell and interference cells in a case that 2 CRS ports are used in the LTE mobile communication system is illustrated in FIG. 1. Here, there is no limitation on the number of CRS ports used in the LTE mobile communication system. So, in the LTE mobile communication system, one CRS port or four CRS ports may be used.

Further, a frequency offset may be applied to a CRS used in each cell in a frequency domain. For example, there is no frequency offset between a CRS of a serving cell and a CRS of an interference cell #0, and there is a frequency offset between the CRS of the serving cell and a CRS of an interference cell #1. That is, a frequency offset between the CRS of the serving cell and the CRS of the interference cell #1 corresponds to one sub-carrier.

As shown in FIG. 1, a location of the CRS used in the interference cell #0 is identical to a location of the CRS used in the serving cell, so the CRS used in the interference cell #0 is a colliding CRS which collides with the CRS used in the serving cell.

A location of the CRS used in the interference cell #1 is different from the location of the CRS used in the serving cell, so the CRS used in the interference cell #1 is a non-colliding CRS which does not collide with the CRS used in the serving cell.

Meanwhile, locations of respective CRSs of the serving cell, the interference cell #0, and the interference cell #1 in a time domain are the same if the serving cell, the interference cell #0, and the interference cell #1 synchronize with one another. However, in the LTE mobile communication system, the serving cell, the interference cell #0, and the interference cell #1 may not synchronize with one another due to various reasons. In this case, the locations of the respective CRSs of the serving cell, the interference cell #0, and the interference cell #1 may vary.

In FIG. 1, each of the serving cell, the interference cell #0, and the interference cell #1 uses two CRS ports.

In a case that two CRS ports are used in the LTE mobile communication system, a physical downlink control channel (PDCCH) signal, a physical control format indicator channel (PCFICH) signal, a physical hybrid indicator channel (PHICH) signal, and a physical broadcast channel (PBCH) signal may be encoded based on a space-frequency block code (SFBC), so a transmit diversity for the PDCCH signal, the PCFICH signal, the PHICH signal, and the PBCH signal may be implemented.

The PCFICH signal, the PHICH signal, and the PDCCH signal are transmitted in a control channel (CCH) region, and transmitted in predetermined OFDM symbols, i.e., an OFDM symbol #0, an OFDM symbol #1, and an OFDM symbol #2 within a sub-frame except for 1.4 MHz. The PBCH signal is periodically transmitted in a preset region within a data channel region.

In a case that a serving cell and interference cells transmit a CCH signal and a data channel signal at the same time, a received signal may be expressed as Equation (1) below.

$$y_k = H_{S,k} x_{S,k} + H_{I,k} x_{I,k} + n_k \quad (1)$$

In Equation (1), k denotes an RE index, and a subscript S indicates a serving cell, and a subscript I indicates an interference cell.

In Equation (1), interference due to one of interference cells shown in FIG. 1, i.e., interference due to the interference cell #0 or the interference cell #1, is expressed as a dominant interference, and remaining interference plus noise is expressed as $n_k$.

In Equation (1), $y_k$ denotes an $N_R \times 1$ received signal, and $N_R$ denotes the number of reception antennas. In Equation (1), H denotes a channel matrix, and x denotes a transmission signal.

As described above, a received signal which is extended based on adjacent two REs may be considered for detecting a characteristic which occurs in a case that an interference cell uses an SFBC encoding scheme. The received signal which is extended using the adjacent two REs, i.e., an RE # k and an RE # k+1, may be expressed as Equation (2) below.

$$\begin{bmatrix} y_{2k} \\ y^*_{2k+1} \end{bmatrix} = \begin{bmatrix} H_{S,2k} & 0 \\ 0 & H^*_{S,2k+1} \end{bmatrix} \begin{bmatrix} x_{S,2k} \\ x^*_{S,2k+1} \end{bmatrix} + \\ \begin{bmatrix} H_{I,2k} & 0 \\ 0 & H^*_{I,2k+1} \end{bmatrix} \begin{bmatrix} x_{I,2k} \\ x^*_{I,2k+1} \end{bmatrix} + \begin{bmatrix} n_{2k} \\ n^*_{2k+1} \end{bmatrix} \quad (2)$$

An interference signal may be differently expressed as Equation (3) and Equation (5) shown below according to whether a signal transmitted in an interference cell is encoded based on an SFBC scheme or an encoding scheme which is not an SFBC scheme, and a characteristic of the interference signal may be expressed as a covariance matrix R.

$$R = \sigma_I^2 \begin{bmatrix} H_{I,2k} & 0_{N_R} \\ 0_{N_R} & H^*_{I,2k} \end{bmatrix} \begin{bmatrix} 1 & 0 & 0 & 1 \\ 0 & 1 & -1 & 0 \\ 0 & -1 & 1 & 0 \\ 1 & 0 & 0 & 1 \end{bmatrix} \begin{bmatrix} H_{I,2k} & 0_{N_R} \\ 0_{N_R} & H^*_{I,2k} \end{bmatrix}^H + \sigma_n^2 I_{2N_R} \quad (3)$$

$$= \sigma_I^2 \begin{bmatrix} h_{I,2k,0} & -h_{I,2k,1} \\ h^*_{I,2k+1,1} & h^*_{I,2k+1,0} \end{bmatrix} \begin{bmatrix} h_{I,2k,0} & -h_{I,2k,1} \\ h^*_{I,2k+1,1} & h^*_{I,2k+1,0} \end{bmatrix}^H + \sigma_n^2 I_{2N_R}$$

Equation (3) denotes a covariance matrix R in a case that a signal transmitted in an interference cell is encoded based on an SFBC scheme. The covariance matrix R as expressed in Equation (3) denotes a covariance matrix in a case that a signal transmitted through two REs, i.e., an RE #2k and an RE #2k+1, in an interference cell is expressed as Equation (4) below.

$$x_{I,2k} = [x_{I,2k}, -x_{I,2k+1}^*]^T, x_{I,2k+1} = [x_{I,2k+1}, x_{I,2k}^*]^T \quad (4)$$

The signal transmitted through two REs, i.e., the RE #2k and the RE #2k+1, in the interference cell as expressed in Equation (4) is an SFBC interference signal. Here, an SFBC interference signal denotes an interference signal which occurs due to a transmission signal encoded based on an SFBC scheme.

$$R = \sigma_I^2 \begin{bmatrix} H_{I,2k} H_{I,2k}^H & 0_{N_R} \\ 0_{N_R} & H_{I,2k+1} H_{I,2k+1}^H \end{bmatrix} + \sigma_n^2 I_{2N_R} \quad (5)$$

Equation (5) denotes a covariance matrix R in a case that a signal transmitted in an interference cell is encoded based on an encoding scheme which is not an SFBC scheme. The covariance matrix R as expressed in Equation (5) denotes a covariance matrix in a case that a signal transmitted through two REs, i.e., an RE #2k and an RE #2k+1, in an interference cell is expressed as Equation (6) below.

$$x_{I,2k} = [x_{I,2k}, x_{I,2k+1}]^T, x_{I,2k+1} = [x_{I,2k+2}, x_{I,2k+3}]^T \quad (6)$$

The signal transmitted through the two REs, i.e., the RE #2k and the RE #2k+1, in the interference cell as expressed in Equation (6) is a non-SFBC interference signal. Here, a non-SFBC interference signal denotes an interference signal generated due to a transmission signal which is not encoded based on an SFBC scheme.

As expressed in Equation (3), in a case that an interference cell performs an encoding operation based on an SFBC scheme, a signal transmitted in the interference cell is expressed as a colored noise, so a receiving apparatus, e.g., an MS, needs an interference whitening (IW) scheme and a detection scheme which consider a characteristic of an interference signal for increasing accuracy of a detection operation. That is, in an exemplary embodiment of the inventive concept, an IW scheme and a detection scheme may be adaptively adjusted according to whether an interference signal is an SFBC interference signal or a non-SFBC interference signal.

As expressed in Equation (3), elements included in a covariance matrix R are affected one another in a frequency domain and a spatial domain. So, upon receiving a signal, an MS needs to perform an IW operation in a two dimension (2D) and perform a detection operation by considering the IW operation.

So, the MS needs to perform a demodulation operation based on interference signal models as expressed in Table 1 below.

TABLE 1

|  | colliding CRS | non-colliding CRS |
| --- | --- | --- |
| CRS symbol | 2D-IW | legacy IW |
| non-CRS symbol < $CFI_I$ | 2D-IW | 2D-IW |
| non-CRS symbol ≥ $CFI_I$ | legacy IW | legacy IW |

In Table 1, a 2D-IW scheme denotes an IW and detection scheme applied to an SFBC interference signal in a case that an interference signal is an SFBC interference signal. That is, the 2D-IW scheme denotes an IW scheme performed in a 2D where a frequency domain and a spatial domain are considered.

In Table 1, a legacy IW scheme denotes an IW scheme which is not the 2D-IW scheme.

In Table 1, a CFI denotes a control format indicator (CFI), and a $CFI_1$ denotes a CFI of an interference cell. Here, a CFI denotes the number of OFDM symbols included in a control channel region.

In Table 1, the MS performs a demodulation operation based on the 2D-IW scheme in a case that a received signal is CRS symbols included in a colliding CRS region.

In Table 1, the MS performs a demodulation operation based on the 2D-IW scheme in a case that a received signal is non-CRS symbols included in a colliding CRS region and the number of the non-CRS symbols included in the colliding CRS region is less than $CFI_1$.

In Table 1, the MS performs a demodulation operation based on the 2D-IW scheme in a case that a received signal is non-CRS symbols included in a non-colliding CRS region and the number of the non-CRS symbols included in the non-colliding CRS region is less than $CFI_1$.

In Table 1, the MS performs a demodulation operation based on the legacy IW scheme in a case that a received signal is CRS symbols included in a non-colliding CRS region.

In Table 1, the MS performs a demodulation operation based on the legacy IW scheme in a case that a received signal is non-CRS symbols included in a colliding CRS region and the number of the non-CRS symbols is equal to or greater than $CFI_1$.

In Table 1, the MS performs a demodulation operation based on the legacy IW scheme in a case that a received signal is non-CRS symbols included in a non-colliding CRS region and the number of the non-CRS symbols is equal to or greater than $CFI_1$.

As described in Table 1, an MS needs to know CRS location information and CFI for each of a serving cell and an interference cell in order to use an IW scheme appropriate or suitable for an interference signal model.

Firstly, an MS demodulates a PBCH signal of each of a serving cell and an interference cell in order to acquire the number of CRSs (or CRS symbols) and frequency offsets used in the LTE mobile communication system. As described above, a PBCH signal is transmitted through OFDM symbols included in a specific sub-frame and transmitted in a plurality of cells.

The MS may acquire a cell identifier (ID) by demodulating a PBCH signal, and acquire a frequency offset between the serving cell and the interference cell based on the acquired cell ID. The MS may acquire the number of CRS ports based on the acquired frequency offset. The MS may acquire a timing offset of each of the serving cell and the interference cell based on the acquired cell ID.

After acquiring the number of CRS ports and CRS location information about each of the serving cell and the interference cell, the MS may identify whether a CRS region of the interference cell is a colliding CRS region or a non-colliding CRS region based on the acquired number of CRS ports and CRS location information.

Meanwhile, the MS needs to acquire a criterion for a control channel region managed in a serving cell and a criterion for a control channel region managed in an interference cell. In the LTE mobile communication system, information related to the number of OFDM symbols used as a control channel region is transmitted through a PCFICH every TTI, so the MS extracts a CFI of each of a serving cell and an interference cell every TTI.

In an exemplary embodiment of the inventive concept, it is important for an MS to detect whether an interference signal is an SFBC interference signal or a non-SFBC interference signal, so the MS detects a region which overlaps a control channel region or a physical downlink shared channel (PDSCH) region of an interference cell among a control channel region, and performs a demodulation operation on a signal received through the region which overlaps the control channel region or the PDSCH region of the interference cell based on a 2D-IW scheme.

Meanwhile, according to a frequency offset, CRS symbols of an interference cell may be an SFBC interference signal or a non-SFBC interference signal with respect to CRS symbols of a serving cell. So, an MS may select an IW scheme and a detection scheme appropriate or suitable for CRS symbols of a serving cell according to whether CRS symbols of an interference cell are an SFBC interference signal or a non-SFBC interference signal. If the CRS symbols of the interference cell are the SFBC interference signal, the MS may perform a demodulation operation based on a 2D-IW scheme.

An example of a demodulating process performed in an MS in an LTE mobile communication system according to an exemplary embodiment of the inventive concept will be described with reference to FIG. 2.

Figure 2:
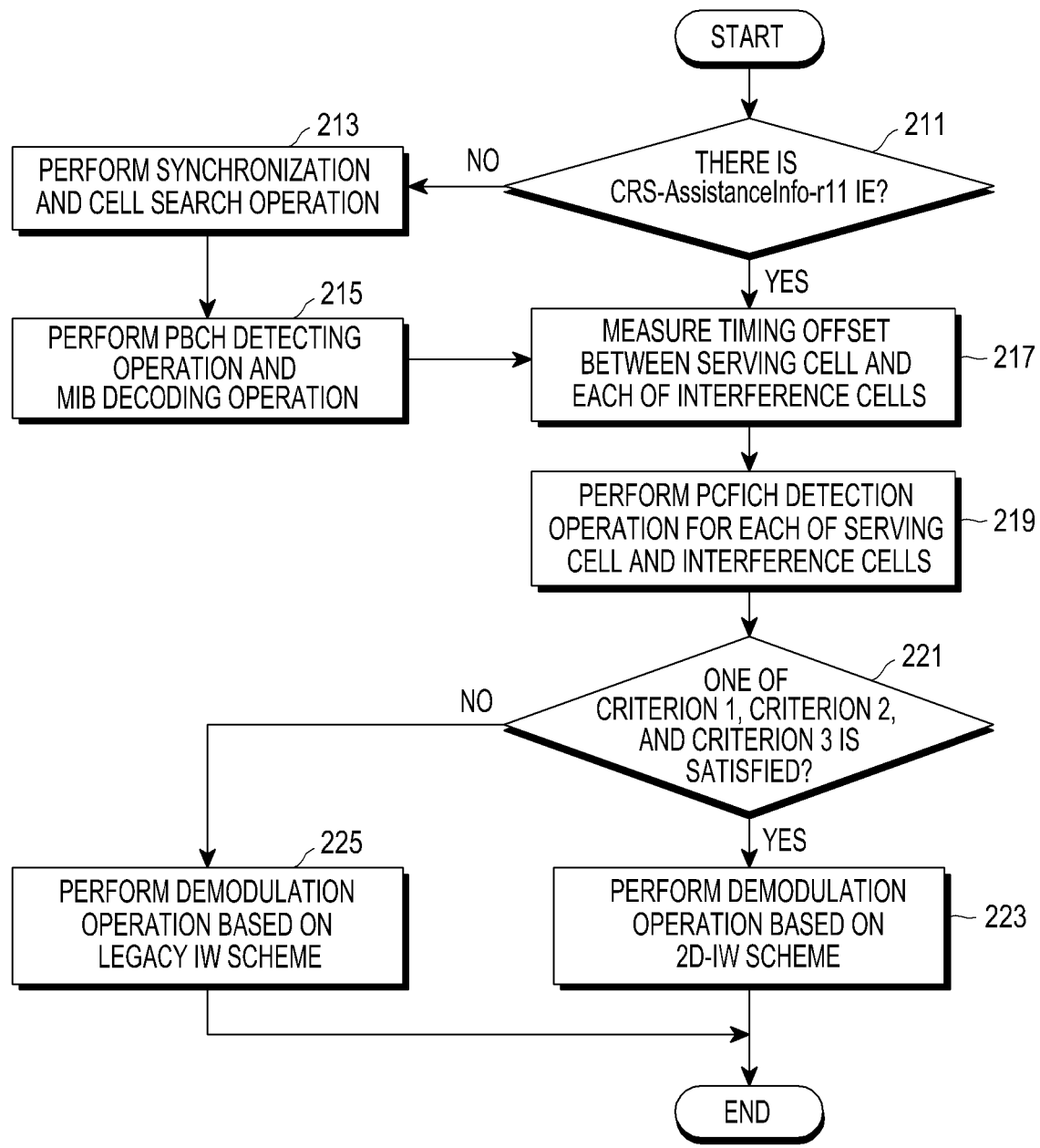
FIG. 2 schematically illustrates an example of a demodulating process performed in an MS in an LTE mobile communication system, according to an exemplary embodiment of the inventive concept.

FIG. 2 schematically illustrates an example of a demodulating process performed in an MS in an LTE mobile communication system according to an exemplary embodiment of the inventive concept.

Referring to FIG. 2, an MS determines whether there is a CRS-AssistanceInfo-r11 IE as a CRS assistance information element (IE) at operation 211. The CRS-AssistanceInfo-r11 IE includes a physCellId-r11, an antennaPortsCount-r11, and an mbsfn-SubframeConfigList-r11. The physCellId-r11 is a parameter denoting a physical cell ID, the antennaPorts- Count-r11 is a parameter denoting antenna port IDs, and the mbsfn-SubframeConfigList-r11 is a parameter denoting multimedia broadcast multicast service single frequency network (MBSFN) frames. The CRS-AssistanceInfo-r11 IE and each of the physCellId-r11, the antennaPortsCount-r11, and the mbsfn-SubframeConfigList-r11 included in the CRS-AssistanceInfo-r11 IE are identical to a CRS-AssistanceInfo-r11 IE, a physCellId-r11, an antennaPortsCount-r11, and an mbsfn-SubframeConfigList-r11 used in an LTE mobile communication system, so a detailed description thereof will be omitted herein.

The CRS-AssistanceInfo-r11 IE may be included in a radio resource config dedicated IE included in a radio resource control (RRC) connection reconfiguration message. The RRC connection reconfiguration message and the radio resource config dedicated IE are identical to a RRC connection reconfiguration message and a radio resource config dedicated IE used in the LTE mobile communication system, so a detailed description thereof will be omitted herein.

If there is no CRS-AssistanceInfo-r11 IE, the MS performs a synchronization and cell search operation at operation 213. The MS performs a PBCH detecting operation from a serving cell and a master information block (MIB) decoding operation at operation 215. Here, the MS may detect a cell ID and CRS ports of the serving cell through the PBCH detection operation and the MIB decoding operation.

The MS measures a timing offset between the serving cell and each of interference cells at operation 217. The timing offset may be measured based on CRS location information of each of the serving cell and interference cells. The MS performs a PCFICH detection operation for each of the serving cell and the interference cells at operation 219. The MS determines whether one of a criterion 1, a criterion 2, and a criterion 3 at operation 221 is satisfied. The criterion 1 denotes a case that an interference signal is CRS symbols included in a colliding CRS region, the criterion 2 denotes a case that an interference signal is non-CRS symbols included in a colliding CRS region and the number of the non-CRS symbols included in the colliding CRS region is less than $CFI_I$, and the criterion 3 denotes a case that an interference signal is non-CRS symbols included in a non-colliding CRS region and the number of the non-CRS symbols included in the non-colliding CRS region is less than $CFI_I$.

If the MS satisfies one of the criterion 1, the criterion 2, and the criterion 3, the MS performs a demodulation operation based on a 2D-IW scheme at operation 223. For example, if the criterion 1 is satisfied, the MS demodulates the CRS symbols included in the colliding CRS region based on the 2D-IW scheme. For another example, if the criterion 2 is satisfied, the MS demodulates the non-CRS symbols included in the colliding CRS region based on the 2D-IW scheme. Here, the number of the non-CRS symbols is less than $CFI_I$. For still another example, if the criterion 3 is satisfied, the MS demodulates the non-CRS symbols included in the non-colliding CRS region based on the 2D-IW scheme. Here, the number of the non-CRS symbols is less than $CFI_I$.

If the MS does not satisfy any one of the criterion 1, the criterion 2, and the criterion 3, the MS proceeds to operation 225. Here, a case that the MS does not satisfy any one of the criterion 1, the criterion 2, and the criterion 3 means that the interference signal is CRS symbols included in the non-colliding CRS region. This case may also mean that the interference signal is non-CRS symbols included in the colliding CRS region or the non-colliding CRS region, where the number of the non-CRS symbols included in the colliding CRS region or non-colliding CRS region is equal to or greater than $CFI_I$.

Although FIG. 2 illustrates an example of a demodulating process performed in an MS in an LTE mobile communication system according to an exemplary embodiment of the inventive concept, various changes could be made to FIG. 2. For example, although shown as a series of operations, various operations in FIG. 2 could overlap, occur in parallel, occur in a different order, or occur multiple times.

In an LTE mobile communication system, various situations may occur as described in Table 1. That is, in the LTE mobile communication system, various situations may occur according to whether an interference signal is a colliding CRS region signal or a non-colliding CRS region signal, whether the interference signal is CRS symbols or non-CRS symbols if the interference signal is the colliding CRS region signal, whether the number of the non-CRS symbols is less than $CFI_I$ if the interference signal is non-CRS symbols included in the colliding CRS region, whether the interference signal is CRS symbols or non-CRS symbols if the interference signal is the non-colliding CRS region signal, or whether the number of the non-CRS symbols is less than $CFI_I$ if the interference signal is the non-CRS symbols included in the non-colliding CRS region.

So, in an exemplary embodiment of the inventive concept, if an MS needs to perform a demodulation operation based on a 2D-IW scheme, the MS may first perform a demodulation operation based on a legacy IW scheme in a first iteration, detect an interference signal model in a second iteration, and perform a demodulation operation based on a 2D-IW scheme corresponding to the detected interference signal model. This will be described below.

An example of a demodulating process performed in an MS which is based on a CRS-interference cancellation (IC)-based 2D-IW scheme in an LTE mobile communication system according to an exemplary embodiment of the inventive concept will be described with reference to FIG. 3.

Figure 3:
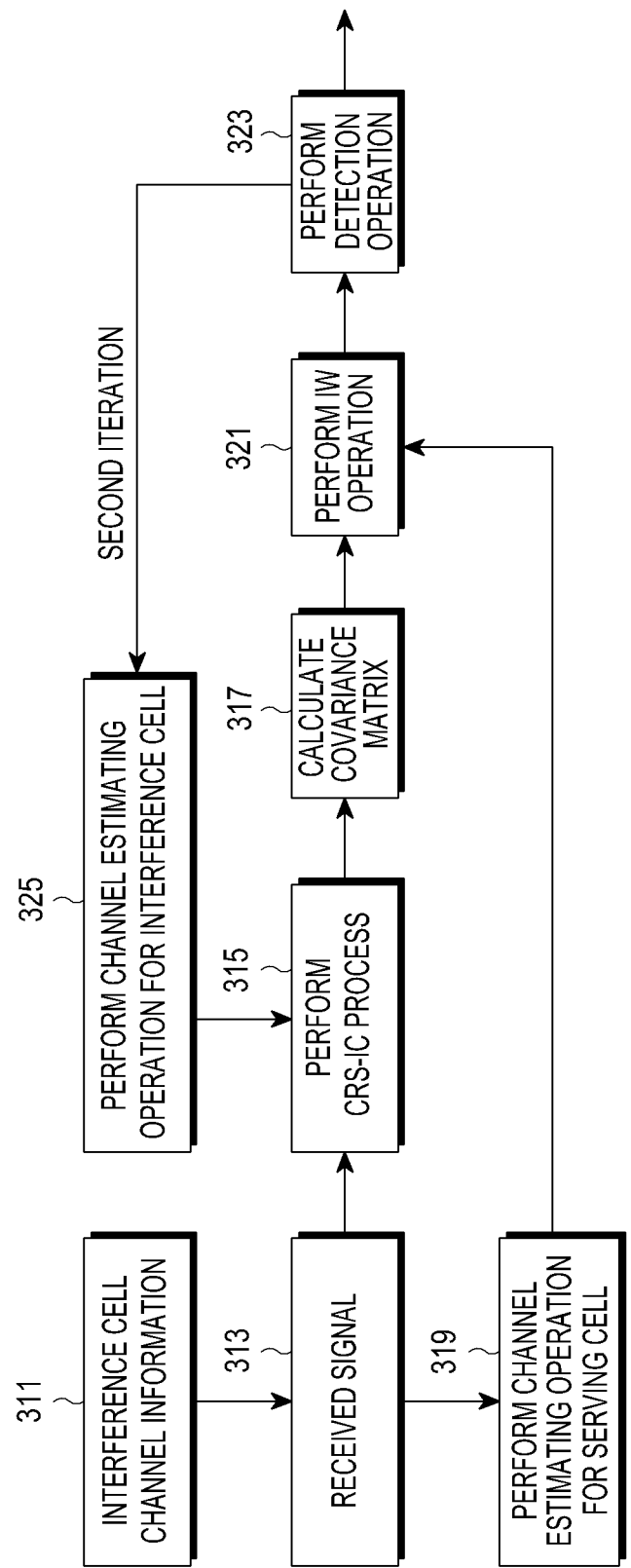
FIG. 3 schematically illustrates an example of a demodulating process performed in an MS which is based on a CRS-IC-based 2D-IW scheme in an LTE mobile communication system, according to an exemplary embodiment of the inventive concept.

FIG. 3 schematically illustrates an example of a demodulating process performed in an MS which is based on a CRS-IC-based 2D-IW scheme in an LTE mobile communication system according to an exemplary embodiment of the inventive concept.

Referring to FIG. 3, for interference signal modeling as expressed in Equation (3), i.e., for interference signal modeling in a case that a signal transmitted in an interference cell is encoded based on an SFBC scheme, an MS may detect colored noise from a received signal 313 based on interference cell channel information 311, e.g., information related to a timing offset of an interference cell, cancels a CRS of each of a serving cell and an interference cell from a colliding CRS region signal, and calculate background noise to express interference and noise.

For this, the MS performs a process as expressed in Equation (7) below, i.e., a process of canceling a CRS of a serving cell from a colliding CRS region signal, i.e., a CRS-IC process in the first iteration at operation 315.

$$R_I = \frac{1}{2K_1} \sum_{k=0}^{K_1-1} \sum_{p=0}^{1} (y_{6k+3p} - h_{S,6k+3p,p})(y_{6k+3p} - h_{S,6k+3p,p})^H \quad (7)$$

$$= \frac{1}{2K_1} \sum_{k=0}^{K_1-1} \sum_{p=0}^{1} (h_{I,6k+3p,p} + n_{6k+3p})(h_{I,6k+3p,p} + n_{6k+3p})^h$$

-continued $$\approx \frac{1}{2} H_{I,2k} H_{I,2k}^H + \sigma_n^2 I_{2N_R}$$

In Equation (7), $K_1$ is a parameter set by the MS and denotes the number of samples used for calculating a covariance matrix, and p denotes a CRS port index. For example, if a value of p is 0, it means a CRS port 0, and if a value of p is 1, it means a CRS port 1.

So, the MS performs a demodulation operation based on Equation (7), i.e., a legacy IW scheme.

In the second iteration, the MS performs a channel estimating operation for an interference cell, cancels a CRS of each of the serving cell and an interference cell from the colliding CRS region signal, and calculates a covariance matrix as expressed in Equation (8) below at operation 317.

$$R_I = \frac{1}{2K_1} \sum_{k=0}^{K_1-1} \sum_{p=0}^{1} (y_{6k+3p} - h_{I,6k+3p,p} - h_{S,6k+3p,p}) \quad (8)$$

$$(y_{6k+3p} - h_{I,6k+3p,p} - h_{S,6k+3p,p})^H$$

$$= \frac{1}{2K_1} \sum_{k=0}^{K_1-1} \sum_{p=0}^{1} (n_{6k+3p})(n_{6k+3p})^H$$

$$\approx \sigma_n^2 I_{2N_R}$$

The MS detects an interference covariance matrix to be used in the second iteration, and the interference covariance matrix may be expressed as Equation (9).

$$R = \begin{bmatrix} R_I & 0_{N_R} \\ 0_{N_R} & R_I^* \end{bmatrix} + \frac{\sigma_I^2}{K_2} \sum_{k=0}^{K_2-1} \begin{bmatrix} h_{I,2k,0} & -h_{I,2k,1} \\ h_{I,2k+1,1}^* & h_{I,2k+1,0}^* \end{bmatrix} \begin{bmatrix} h_{I,2k,0} & -h_{I,2k,1} \\ h_{I,2k+1,1}^* & h_{I,2k+1,0}^* \end{bmatrix}^H \quad (9)$$

The MS performs a channel estimating operation for a serving cell based on the received signal 313 at operation 319.

The MS performs an IW operation based on the covariance matrix, the interference covariance matrix, and the channel estimated result for the serving cell at operation 321, and performs a detection operation on a signal that the IW operation is performed at operation 323.

After performing the detection operation, the MS performs a channel estimating operation for the interference cell at operation 325. The MS performs a process of cancelling a CRS of a serving cell and a CRS of an interference cell from the colliding CRS region signal based on the channel estimated result for the interference cell and the received signal 313 at operation 315. That is, the MS performs a process of cancelling the CRS of the serving cell and the CRS of the interference cell from the colliding CRS region signal in the second iteration at operation 315, an operation after the operation has been described above, so a detailed description thereof will be omitted herein.

Meanwhile, an influence according to a timing offset between a serving cell and an interference cell is not reflected on the covariance matrix as expressed in Equation (8) and the interference covariance matrix as expressed in Equation (9).

In a case that there is a timing offset between the serving cell and the interference cell, if an SFBC encoding scheme is not applied to a signal transmitted in the interference cell, a covariance matrix is not affected by the timing offset between the serving cell and the interference cell.

In a case that there is the timing offset between the serving cell and the interference cell, if an SFBC encoding scheme is applied to a signal transmitted in the interference cell, a covariance matrix is affected by the timing offset between the serving cell and the interference cell. Here, the influence on the covariance matrix by the timing offset between the serving cell and the interference cell may be expressed as Equation (10) below.

$$R = \begin{bmatrix} h_{I,2k,0} h_{I,2k,0}^H + h_{I,2k,1}^H h_{I,2k,1}^H & \left( \begin{array}{c} h_{I,2k,0} h_{I,2k+1,1}^T - \\ h_{I,2k,1} h_{I,2k+1,0}^T \end{array} \right) e^{-\frac{j2\pi(4k+1)\tau_D}{N}} \\ \left( \begin{array}{c} h_{I,2k+1,1}^* h_{I,2k,0}^H - \\ h_{I,2k+1,0}^* h_{I,2k,1}^H \end{array} \right) e^{\frac{j2\pi(4k+1)\tau_D}{N}} & h_{I,2k+1,1}^* h_{I,2k+1,1}^T + h_{I,2k+1,0}^* h_{I,2k+1,0}^T \end{bmatrix} \quad (10)$$

In Equation (10), $\tau_D$ denotes the timing offset between the serving cell and the interference cell.

As expressed in Equation (10), if there is the timing offset between the serving cell and the interference cell, an off-diagonal term of a covariance matrix is changed to a form that is affected by a sub-carrier.

As expressed in Equation (10), if a covariance matrix is affected by the timing offset between the serving cell and the interference cell, performance of a demodulation operation which is based on the 2D-IW scheme described above may be degraded.

So, an exemplary embodiment of the inventive concept proposes a scheme of differently applying a timing offset per OFDM symbol.

That is, an exemplary embodiment of the inventive concept proposes an interference mitigating scheme that causes only a symbol to which a 2D-IW scheme is applied in a time domain to have a fast Fourier transform (FFT) timing based on a dominant interference cell even though a phase shift on an off diagonal term of a covariance matrix is relatively large.

Another example of a demodulating process of an MS in an LTE mobile communication system according to an exemplary embodiment of the inventive concept will be described with reference to FIG. 4.

Figure 4:
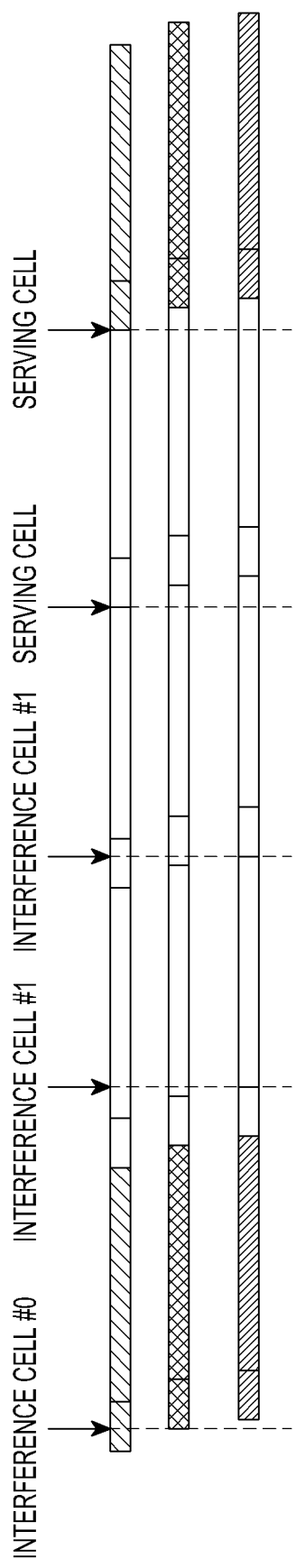
FIG. 4 schematically illustrates another example of a demodulating process of an MS in an LTE mobile communication system, according to an exemplary embodiment of the inventive concept.

FIG. 4 schematically illustrates another example of a demodulating process of an MS in an LTE mobile communication system according to an embodiment of the inventive concept.

Referring to FIG. 4, it will be noted that a demodulation process in FIG. 4 is a demodulation process in a case that an interference mitigating scheme that causes only a symbol to which a 2D-IW scheme is applied in a time domain to have an FFT timing based on a dominant interference cell is applied.

As shown in FIG. 1, it will be assumed that there are a serving cell and interference cells, i.e., an interference cell #0 and an interference cell #1, and strength of an interference signal due to the interference cell #1 is greater than strength of an interference signal due to the interference cell #0.

It will be assumed that a timing relation between the serving cell, the interference cell #0, and the interference cell #1 is the same as FIG. 4.

In the first OFDM symbol, the interference cell #0 may apply an SFBC scheme based on a serving cell. However, in the first OFDM symbol, it is difficult for the interference cell #1 to apply an SFBC scheme even though the interference cell #1 acts as greater interference to the serving cell compared to the interference cell #0.

So, in this case, an MS synchronizes with FFT timing of the interference cell #0, not FFT timing of the serving cell, and circular shifts based on the FFT timing of the serving cell.

In the second OFDM symbol, all of the interference cell #0 and interference cell #1 may apply an SFBC scheme based on the serving cell. So, in the second OFDM symbol, the MS synchronizes with an FFT timing of a cell of which power of a signal received by the MS is greater than the other cell between the interference cell #0 and interference cell #1, and circular shifts based on the FFT timing of the serving cell. In FIG. 4, it will be assumed that the cell of which the power of the signal received by the MS is greater than the other cell is the interference cell #1.

In the third OFDM symbol, all of the interference cell #0 and interference cell #1 may apply an SFBC scheme based on the serving cell. So, in the third OFDM symbol, the MS synchronizes with an FFT timing of a cell of which power of a signal received by the MS is greater than the other cell between the interference cell #0 and interference cell #1, and circular shifts based on the FFT timing of the serving cell. In FIG. 4, it will be assumed that the cell of which the received power of the signal received by the MS is greater than the other cell is the interference cell #1.

In the fourth OFDM symbol and after the fourth OFDM symbol, the MS synchronizes with the FFT timing of the serving cell regardless of whether an interference cell may apply an SFBC scheme and a size of received power for an interference cell.

Another example of a demodulating process of an MS in an LTE mobile communication system according to an exemplary embodiment of the inventive concept has been described with reference to FIG. 4, and an operating process of an MS in an LTE mobile communication system according to an exemplary embodiment of the inventive concept will be described with reference to FIG. 5.

Figure 5:
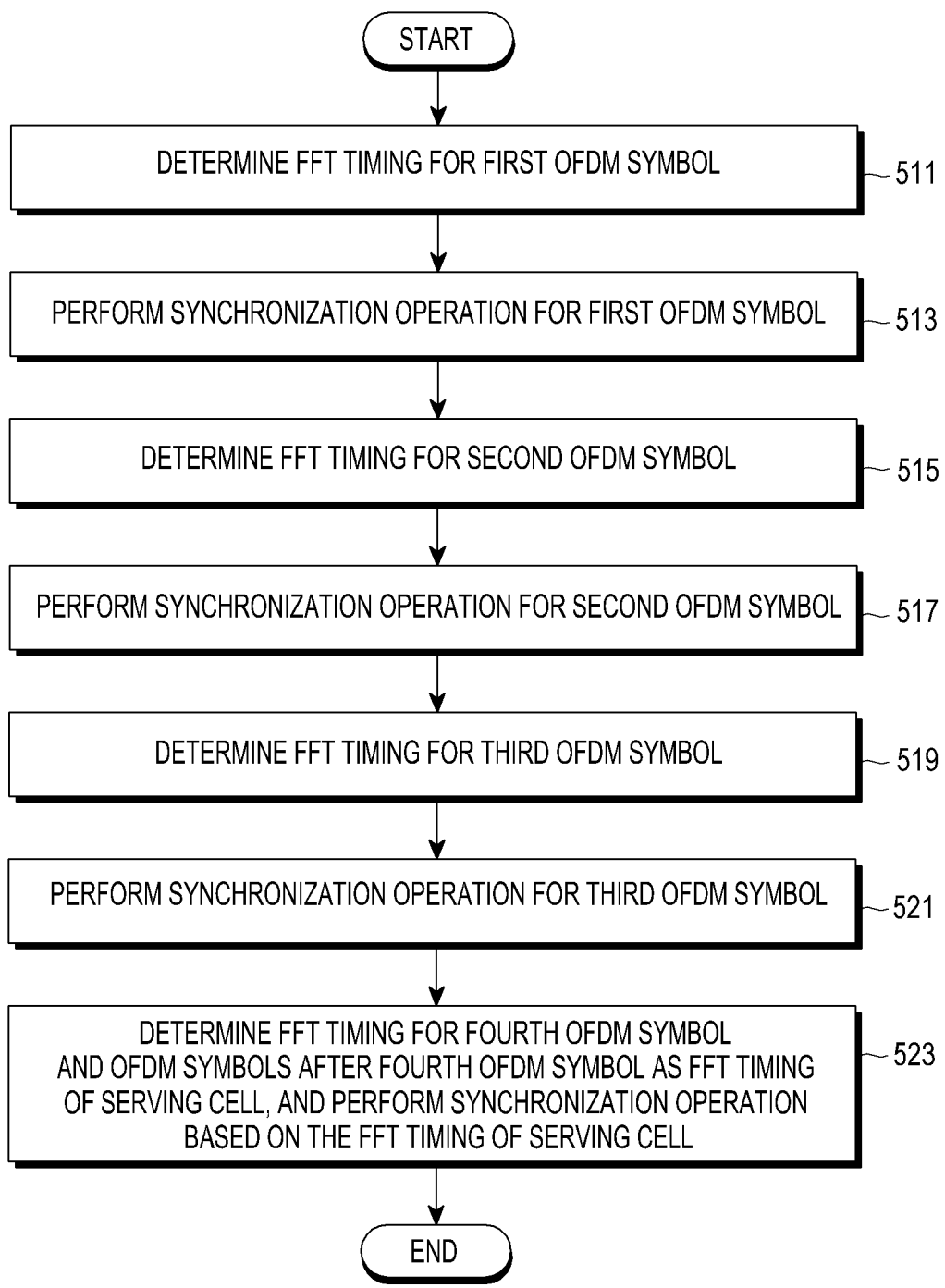
FIG. 5 schematically illustrates an operating process of an MS in an LTE mobile communication system, according to an exemplary embodiment of the inventive concept.

FIG. 5 schematically illustrates an operating process of an MS in an LTE mobile communication system according to an exemplary embodiment of the inventive concept.

Referring to FIG. 5, it will be noted that an operating process of an MS in FIG. 5 is an operating process of an MS in a case that an interference mitigating scheme that causes only a symbol to which a 2D-IW scheme is applied to in a time domain to have an FFT timing based on a dominant interference cell is applied.

It will be noted that the operating process of the MS in FIG. 5 is an operating process of an MS in a case that a serving cell and interference cells, i.e., an interference cell #0 and an interference cell #1 as shown in FIG. 1, strength of an interference signal due to the interference cell #1 is greater than strength of an interference signal due to the interference cell #0, and a timing relation among the serving cell, the interference cell #0, and the interference cell #1 is the same as FIG. 4.

An MS determines FFT timing for the first OFDM symbol at operation 511. In the first OFDM symbol, the interference cell #0 may apply an SFBC scheme based on a serving cell. However, in the first OFDM symbol, it is difficult for the interference cell #1 to apply an SFBC scheme even though the interference cell #1 acts as greater interference to the serving cell compared to the interference cell #0. So, the MS determines FFT timing of the interference cell #0, not the FFT timing of the serving cell as the FFT timing for the first OFDM symbol at operation 511.

The MS performs a synchronization operation based on the FFT timing determined for the first OFDM symbol at operation 513. That is, in the first OFDM symbol, the MS synchronizes with the FFT timing of the interference cell #0, not the FFT timing of the serving cell in the first OFDM symbol, and circular shifts based on the FFT timing of the serving cell.

The MS determines FFT timing for the second OFDM symbol at operation 515. In the second OFDM symbol, all of the interference cell #0 and interference cell #1 may apply an SFBC scheme based on the serving cell. So, in the second OFDM symbol, the MS determines an FFT timing of a cell of which power of a signal received by the MS is greater than the other cell between the interference cell #0 and interference cell #1 as the FFT timing for the second OFDM symbol.

The MS performs a synchronization operation based on the FFT timing determined for the second OFDM symbol at operation 517. That is, in the second OFDM symbol, the MS synchronizes with the FFT timing of the cell of which the received power of the signal received by the MS is greater than other cells between the interference cell #0 and interference cell #1, and circular shifts based on the FFT timing of the serving cell.

The MS determines FFT timing for the third OFDM symbol at operation 519. In the third OFDM symbol, all of the interference cell #0 and interference cell #1 may apply an SFBC scheme based on the serving cell. So, in the third OFDM symbol, the MS determines an FFT timing of a cell of which power of a signal received by the MS is greater than the other cell between the interference cell #0 and interference cell #1 as the FFT timing for the third OFDM symbol.

The MS performs a synchronization operation based on the FFT timing determined for the third OFDM symbol at operation 521. That is, in the third OFDM symbol, the MS synchronizes with the FFT timing of the cell of which the power of the signal received by the MS is greater than the other cell between the interference cell #0 and interference cell #1, and circular shifts based on the FFT timing of the serving cell.

The MS determines FFT timing for the fourth OFDM symbol and OFDM symbols after the fourth OFDM symbol as FFT timing of the serving cell, and performs a synchronization based on the determined FFT timing at operation 523. That is, in the fourth OFDM symbol and OFDM symbols after the fourth OFDM symbol, the MS synchronizes with the FFT timing of the serving cell regardless of whether an interference cell may apply an SFBC scheme and a size of received power for an interference cell.

Although FIG. 5 illustrates an operating process of an MS in an LTE mobile communication system according to an exemplary embodiment of the inventive concept, various changes could be made to FIG. 5. For example, although shown as a series of operations, various operations in FIG. 5 could overlap, occur in parallel, occur in a different order, or occur multiple times.

An operating process of an MS in an LTE mobile communication system according to an exemplary embodiment of the inventive concept has been described with reference to FIG. 5, and an inner structure of a communication device in an LTE mobile communication system according to various exemplary embodiments of the inventive concept will be described with reference to FIG. 6.

Figure 6:
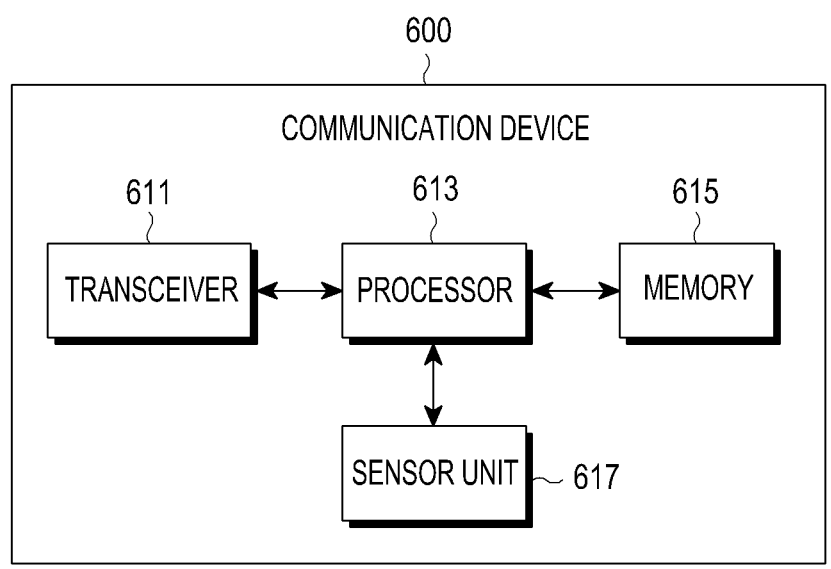
FIG. 6 schematically illustrates an example of an inner structure of a communication device in an LTE mobile communication system, according to various exemplary embodiments of the inventive concept.

FIG. 6 schematically illustrates an example of an inner structure of a communication device in an LTE mobile communication system according to various exemplary embodiments of the inventive concept.

Referring to FIG. 6, a communication device 600 according to various exemplary embodiments of the inventive concept includes a transceiver 611, a processor 613, a memory 615, and a sensor unit 617.

The transceiver 611 performs a communication operation among the communication device 600 and external devices, e.g., an MS other than an MS in which the communication device 600 is included, a BS, and/or the like. The terms such as "transceiver", "communication module" and "communication interface" may be interchangeably used.

The transceiver 611 may perform a communication operation with the external devices based on various communication schemes, and this will be described below.

The transceiver 611 may perform a communication operation with the external devices based on a wireless communication scheme, and the wireless communication scheme may include a cellular communication scheme, e.g., an LTE scheme, an LTE-A scheme, a CDMA scheme, a WCDMA scheme, a universal mobile telecommunications system (UMTS) scheme, a wireless broadband (WiBro) scheme, a global system for mobile communications (GSM) scheme, and/or the like.

The wireless communication scheme may include a short-range communication scheme, e.g., a wireless fidelity (Wi-Fi) scheme, a Bluetooth© scheme, a near field communication (NFC) scheme, a global navigation satellite system (GNSS) scheme, and the like. Here, the GNSS scheme may include at least one of a GPS, a global navigation satellite system (Glonass), a beidou navigation satellite system (Beidou), and Galileo, the European global satellite-based navigation system according to a use area, a bandwidth, and/or the like. For convenience, the terms such as "GPS" and "GNSS may be interchangeably used.

The transceiver 611 may perform a communication operation with the external devices based on a wired communication scheme, and the wired communication scheme may include at least one of a universal serial bus (USB) scheme, a high definition multimedia interface (HDMI) scheme, a recommended standard 232 (RS-232) scheme, a plain old telephone service (POTS) scheme, and/or the like.

The transceiver 611 transmits and receives various signals and various messages related to demodulation of an interference signal or an interference mitigating scheme according to various exemplary embodiments of the inventive concept, i.e., a scheme of mitigating interference by considering an encoding scheme used in an interference cell and a timing offset between a serving cell and the interference cell. The various signals and the various messages transmitted and received in the transceiver 611 have been described in FIGS. 1 to 5 and a description thereof will be omitted herein.

The processor 613 may include a communication processor (CP). According to various exemplary embodiments of the inventive concept, the processor 613 may include at least one of a central processing unit (CPU) and an application processor (AP). For example, the processor 613 may perform an operation related to calculation or data processing related to a control and/or a communication of at least one other unit included in the communication device 600. According to various exemplary embodiments of the inventive concept, the terms such as "processor", "control module", "control unit", and "controller" may be interchangeably used in some embodiments.

The processor 613 controls an operation related to demodulation of an interference signal or an interference mitigating scheme according to various exemplary embodiments of the inventive concept. The operation related to the demodulation of an interference signal and an interference mitigating scheme according to various exemplary embodiments of the inventive concept have been described in FIGS. 1 to 5 and a description thereof will be omitted herein.

The memory 615 may include a volatile memory and/or a non-volatile memory. For example, the memory 615 may store a command or data related to at least one other unit included in the communication device 600. According to various exemplary embodiments of the inventive concept, the memory 615 may store a software and/or a program. For example, the program may include a kernel, a middleware, an application programming interface (API) and/or an application program (or an application), and the like. In FIG. 6, the memory 615 is included in the communication device 600, however, the communication device 600 does not have to include the memory 615.

The memory 615 stores various programs, various data, and the like related to an operation related to the demodulation of an interference signal or an interference mitigating scheme according to various exemplary embodiments of the inventive concept. The operation related to the demodulation of an interference signal or an interference mitigating scheme according to various embodiments of the inventive concept have been described in FIGS. 1 to 5 and a description thereof will be omitted herein.

The sensor unit 617 may include an inertial sensor, and the inertial sensor may include an acceleration sensor, an angular velocity sensor, a magnetic field sensor, and the like. Sensor information which is sensed in the sensor unit 617 is transferred to the processor 613, and the processor 613 performs an operation related to the demodulation of an interference signal or an interference mitigating scheme according to various exemplary embodiments of the inventive concept based on the sensor information which is transferred from the sensor unit 617.

While the transceiver 611, the processor 613, the memory 615, and the sensor unit 617 are described in the communication device 600 as separate units, it is to be understood that this is merely for convenience of description. In other words, two or more of the transceiver 611, the processor 613, the memory 615, and the sensor unit 617 may be incorporated into a single unit.

The communication device 600 may be implemented with one chipset.

An example of an inner structure of a communication device in an LTE mobile communication system according to various exemplary embodiments of the inventive concept has been described with reference to FIG. 6, and an example of an inner structure of an MS included in a communication device in an LTE mobile communication system according to various exemplary embodiments of the inventive concept will be described with reference to FIG. 7.

Figure 7:
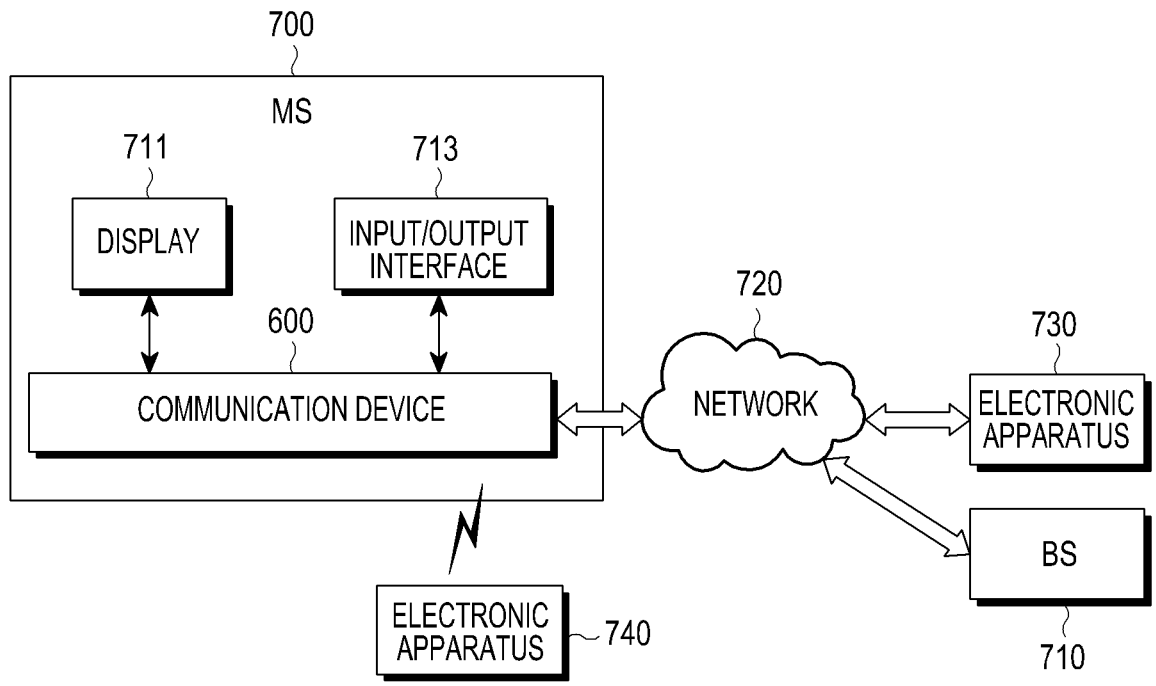
FIG. 7 schematically illustrates an example of an inner structure of an MS included in a communication device in an LTE mobile communication system, according to various exemplary embodiments of the inventive concept.

FIG. 7 schematically illustrates an example of an inner structure of an MS included in a communication device in an LTE mobile communication system according to various exemplary embodiments of the inventive concept.

Referring to FIG. 7, an MS 700 according to various exemplary embodiments of the inventive concept may include a communication device 600, a display 711, and an input/output interface 713.

The communication device 600 may communicate with external electronic apparatuses, e.g., an electronic apparatus 730 and an electronic apparatus 740, and may communicate with a BS 710. The communication device 600 has been described in FIG. 6 and a description thereof will be omitted herein.

The display 711 may be implemented with various forms, e.g., a liquid crystal display (LCD), a light-emitting diode (LED) display, an organic light-emitting diode (OLED) display, a microelectromechanical systems (MEMS) display, an electronic paper display, and/or the like.

The display 711 may display various contents, e.g., a text, an image, a video, an icon, a symbol, and/or the like. The display 711 may include a touch screen, and receive a touch, a gesture, an approach, or a hovering input.

The input/output interface 713 may perform a role of an interface which transfers an input command or data to other units included in the MS 700. The input/output interface 713 may output a user command or data received from the other units included in the MS 700.

According to various exemplary embodiments of the inventive concept, the MS 700 may further include a storage module, e.g., a memory, and/or the like, or a processor, e.g., an AP, and/or the like.

While the communication device 600, the display 711, and the input/output interface 713 are described in the MS 700 as separate units, it is to be understood that this is merely for convenience of description. In other words, two or more of the communication device 600, the display 711, and the input/output interface 713 may be incorporated into a single unit.

The MS 700 may be implemented with one chipset.

An example of an inner structure of an MS included in a communication device in an LTE mobile communication system according to various exemplary embodiments of the inventive concept has been described with reference to FIG. 7, and an example of an inner structure of a BS in an LTE mobile communication system according to various exemplary embodiments of the inventive concept will be described with reference to FIG. 8.

Figure 8:
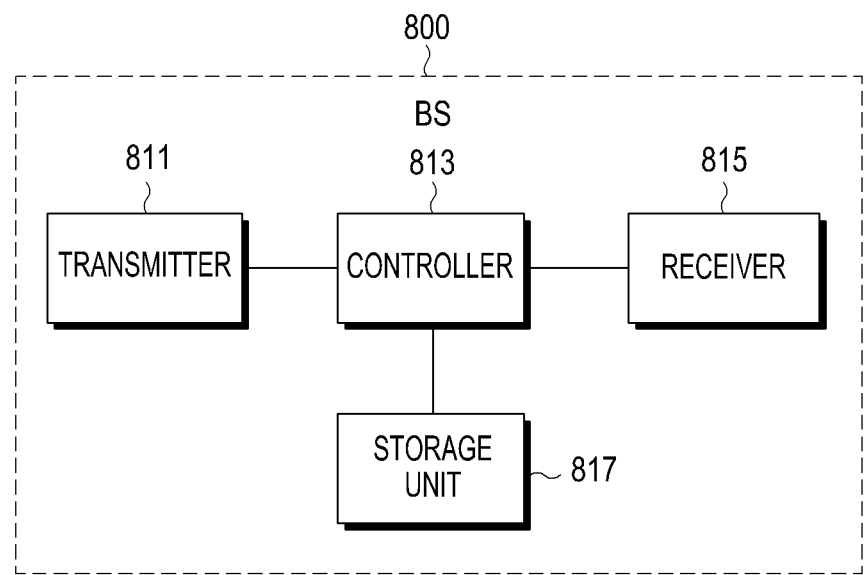
FIG. 8 schematically illustrates an example of an inner structure of a BS in an LTE mobile communication system, according to various exemplary embodiments of the inventive concept.

FIG. 8 schematically illustrates an example of an inner structure of a BS in an LTE mobile communication system according to various exemplary embodiments of the inventive concept.

Referring to FIG. 8, a BS 800 includes a transmitter 811, a controller 813, a receiver 815, and a storage unit 817.

The controller 813 controls the overall operation of the BS 800. More particularly, the controller 813 controls the BS 800 to perform an operation related to demodulation of an interference signal or an interference mitigating scheme, i.e., a scheme of mitigating interference by considering an encoding scheme used in an interference cell and a timing offset between a serving cell and the interference cell according to various exemplary embodiments of the inventive concept. The operation related to the interference mitigating scheme according to various exemplary embodiments of the inventive concept is performed in the manner described with reference to FIGS. 1 to 5, and a description thereof will be omitted herein.

The transmitter 811 transmits various signals and various messages, and the like to other entities, e.g., a communication device, and/or the like under a control of the controller 813. The various signals, the various messages, and the like transmitted in the transmitter 811 have been described in FIGS. 1 to 5 and a description thereof will be omitted herein.

The receiver 815 receives various signals, various messages, and the like from the other entities under a control of the controller 813. The various signals, the various messages, and the like received in the receiver 815 have been described in FIGS. 1 to 5 and a description thereof will be omitted herein.

The storage unit 817 stores a program related to the operation related to the demodulation of an interference signal or an interference mitigating scheme according to various exemplary embodiments of the inventive concept which the BS 800 performs under a control of the controller 813, various data, and/or the like.

The storage unit 817 stores the various signals and the various messages which the receiver 815 receives from the other entities, and/or the like.

While the transmitter 811, the controller 813, the receiver 815, and the storage unit 817 are described in the BS 800 as separate units, it is to be understood that this is merely for convenience of description. In other words, two or more of the transmitter 811, the controller 813, the receiver 815, and the storage unit 817 may be incorporated into a single unit.

The BS 800 may be implemented with one chipset.

As is apparent from the foregoing description, an exemplary embodiment of the inventive concept enables to mitigate interference in a wireless communication system.

An exemplary embodiment of the inventive concept enables to mitigate interference in a control channel region in a wireless communication system.

An exemplary embodiment of the inventive concept enables to mitigate interference in a control channel region by considering an encoding scheme used in an interference cell in a wireless communication system.

An exemplary embodiment of the inventive concept enables to mitigate interference in a control channel region by considering a timing offset between a service cell and an interference cell in a wireless communication system.

An exemplary embodiment of the inventive concept enables to adaptively set a demodulation scheme applied to a control channel region.

Certain aspects of the inventive concept may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the inventive concept can be easily construed by programmers skilled in the art to which the inventive concept pertains.

It can be appreciated that a method and apparatus according to an embodiment of the inventive concept may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an exemplary embodiment of the inventive concept may be implemented by a computer or a mobile terminal that includes a controller and a memory, and the memory may be an example of a non-transitory machine-readable (e.g., computer-readable), storage medium suitable to store a program or programs including instructions for implementing various exemplary embodiments of the inventive concept.

The inventive concept may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the inventive concept may include their equivalents.

An apparatus according to an exemplary embodiment of the inventive concept may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the inventive concept has been shown and described with reference to various embodiments thereof, it will be understood by those skilled in the art that various changes in form and details may be made therein without departing from the spirit and scope of the inventive concept as defined by the appended claims and their equivalents.

What is claimed is:

1. A chipset comprising at least one processor configured to acquire an interference whitening (IW) and detection scheme and demodulate an interference signal based on the acquired IW and detection scheme,
wherein the IW and detection scheme is determined based on an interference characteristic of the interference signal,
wherein the interference characteristic is determined based on whether a region in which the interference signal is included collides with a reference signal region of a serving cell and whether the interference signal is a reference signal,
wherein each of the region in which the interference signal is included and the reference signal region is a cell-specific reference signal (CRS) region where CRS symbols are included, and the reference signal is a CRS,
wherein the CRS region is defined by a number of subframes and frequencies, and
wherein the at least one processor is configured to acquire a timing offset between the serving cell and an interference cell which transmits the interference signal and demodulate the interference signal by considering the timing offset.

2. The chipset of claim 1, wherein
if the interference characteristic indicates that the region in which the interference signal is included collides with the reference signal region of the serving cell and the interference signal is the reference signal,
the at least one processor is configured to demodulate the interference signal based on an IW and detection scheme which is applied to an interference signal which is encoded based on a space-frequency block code (SFBC) scheme.

3. The chipset of claim 1, wherein
if the interference characteristic indicates that the region in which the interference signal is included collides with the reference signal region of the serving cell,
the interference signal is not the reference signal, and
a number of symbols included in the interference signal is less than a number of symbols included in a control channel region,
the at least one processor is configured to demodulate the interference signal based on an IW and detection scheme which is applied to an interference signal which is encoded based on a space-frequency block code (SFBC) scheme.

4. The chipset of claim 1, wherein
if the interference characteristic indicates that the region in which the interference signal is included does not collide with the reference signal region of the serving cell,
the interference signal is not the reference signal, and
a number of symbols included in the interference signal is less than a number of symbols included in a control channel region,
the at least one processor is configured to demodulate the interference signal based on an IW and detection scheme which is applied to an interference signal which is encoded based on a space-frequency block code (SFBC) scheme.

5. The chipset of claim 1, wherein if there are at least two interference cells, the at least one processor is configured to acquire fast Fourier transform (FFT) timing of an interference cell, where a space-frequency block code (SFBC) scheme is applicable, among the at least two interference cells, and synchronize with the acquired FFT timing.

6. The chipset of claim 1, wherein if there are at least two interference cells, and a space-frequency block code (SFBC) is applicable to the at least two interference cells, the at least one processor is configured to acquire fast Fourier transform (FFT) timing of an interference cell which generates the greatest signal power among the at least two interference cells, and synchronize with the acquired FFT timing.

7. The chipset of claim 1, wherein if there are at least two interference cells, a space-frequency block code (SFBC) is applicable to the at least two interference cells, and symbol intervals of which a number is equal to a sum of a number of the serving cell and a number of the at least two interference cells has elapsed, the at least one processor is configured to acquire fast Fourier transform (FFT) timing of the serving cell, and synchronize with the acquired FFT timing.

8. A chipset comprising:
a memory comprising computer executable instructions; and
at least one processor configured to read and execute the computer executable instructions to demodulate an interference signal in at least one interference cell using an interference whitening (IW) scheme suitable for a reference signal in a serving cell,
wherein the IW scheme is selected from among a plurality of different IW schemes based on a location of the interference signal in the interference cell with respect to the reference signal of the serving cell, whether the interference signal is a reference signal in the interference cell, and a number of symbols included in the interference signal if the interference signal is not the reference signal.

9. The chipset of claim 8, wherein the location of the interference signal in the interference cell with respect to the reference signal in the serving cell is determined by comparing a frequency offset between the interference signal and the reference signal.

10. The chipset of claim 9, wherein the IW scheme is selected based on the number of symbols included in the interference signal in view of a number of symbols included in a control channel region.

11. The chipset of claim 8, wherein the at least one processor is further configured to read and execute the computer executable instructions to apply a timing offset between the serving cell and the interference cell prior to demodulating the interference signal such that if the interference cell comprises at least two interference cells, the at least one processor acquires fast Fourier transform (FFT) timing of an interference cell that a space-frequency block code (SFBC) scheme is applicable among the at least two interference cells, and synchronizes with the acquired FFT timing.

12. The chipset of claim 8, wherein the at least one processor is further configured to read and execute the computer executable instructions to apply a timing offset between the serving cell and the interference cell prior to demodulating the interference signal such that if the interference cell comprises at least two interference cells, and a space-frequency block code (SFBC) is applicable to the at least two interference cells, the at least one processor acquires fast Fourier transform (FFT) timing of an interference cell which generates a greatest signal power among the at least two interference cells, and synchronizes with the acquired FFT timing.

13. A method of mitigating interference, the method comprising:
    acquiring an interference whitening (IW) and detection scheme; and
    demodulating an interference signal based on the acquired IW and detection scheme,
    wherein the IW and detection scheme is determined based on an interference characteristic of the interference signal,
    wherein the interference characteristic is determined based on whether a region in which the interference signal is included collides with a reference signal region of a serving cell and whether the interference signal is a reference signal,
    wherein each of the region in which the interference signal is included and the reference signal region is a cell-specific reference signal (CRS) region where CRS symbols are included, and the reference signal is a CRS,
    wherein the CRS region is defined by a number of subframes and frequencies,
    wherein the method further comprises acquiring a timing offset between the serving cell and an interference cell which transmits the interference signal, and
    wherein the demodulating of the interference signal comprises demodulating the interference signal by considering the timing offset.

14. The method of claim 13, wherein the demodulating of the interference signal based on the acquired IW and detection scheme comprises:
    if the interference characteristic indicates that the region in which the interference signal is included collides with the reference signal region of the serving cell and the interference signal is the reference signal, demodulating the interference signal based on an IW and detection scheme which is applied to an interference signal which is encoded based on a space-frequency block code (SFBC) scheme.

15. The method of claim 13, wherein the demodulating of the interference signal based on the acquired IW and detection scheme comprises:
    if the interference characteristic indicates that the region in which the interference signal is included collides with the reference signal region of the serving cell, the interference signal is not the reference signal, and a number of symbols included in the interference signal is less than a number of symbols included in a control channel region, demodulating the interference signal based on an IW and detection scheme which is applied to an interference signal which is encoded based on a space-frequency block code (SFBC) scheme.

16. The method of claim 13, wherein the demodulating of the interference signal based on the acquired IW and detection scheme comprises:
    if the interference characteristic indicates that the region in which the interference signal is included does not collides with the reference signal region of the serving cell, the interference signal is not the reference signal, and a number of symbols included in the interference signal is less than a number of symbols included in a control channel region, demodulating the interference signal based on an IW and detection scheme which is applied to an interference signal which is encoded based on a space-frequency block code (SFBC) scheme.

17. The method of claim 13, wherein the demodulating of the interference signal based on the acquired IW and detection scheme comprises:
    if there are at least two interference cells, acquiring fast Fourier transform (FFT) timing of an interference cell, where a space-frequency block code (SFBC) scheme is applicable, among the at least two interference cells, and synchronizing with the acquired FFT timing.

18. The method of claim 13, wherein the demodulating of the interference signal based on the acquired IW and detection scheme comprises:
    if there are at least two interference cells, and a space-frequency block code (SFBC) is applicable to the at least two interference cells, acquiring fast Fourier transform (FFT) timing of an interference cell which generates the greatest signal power among the at least two interference cells, and synchronizing with the acquired FFT timing.

* * * * *